UNITED STATES PATENT OFFICE.

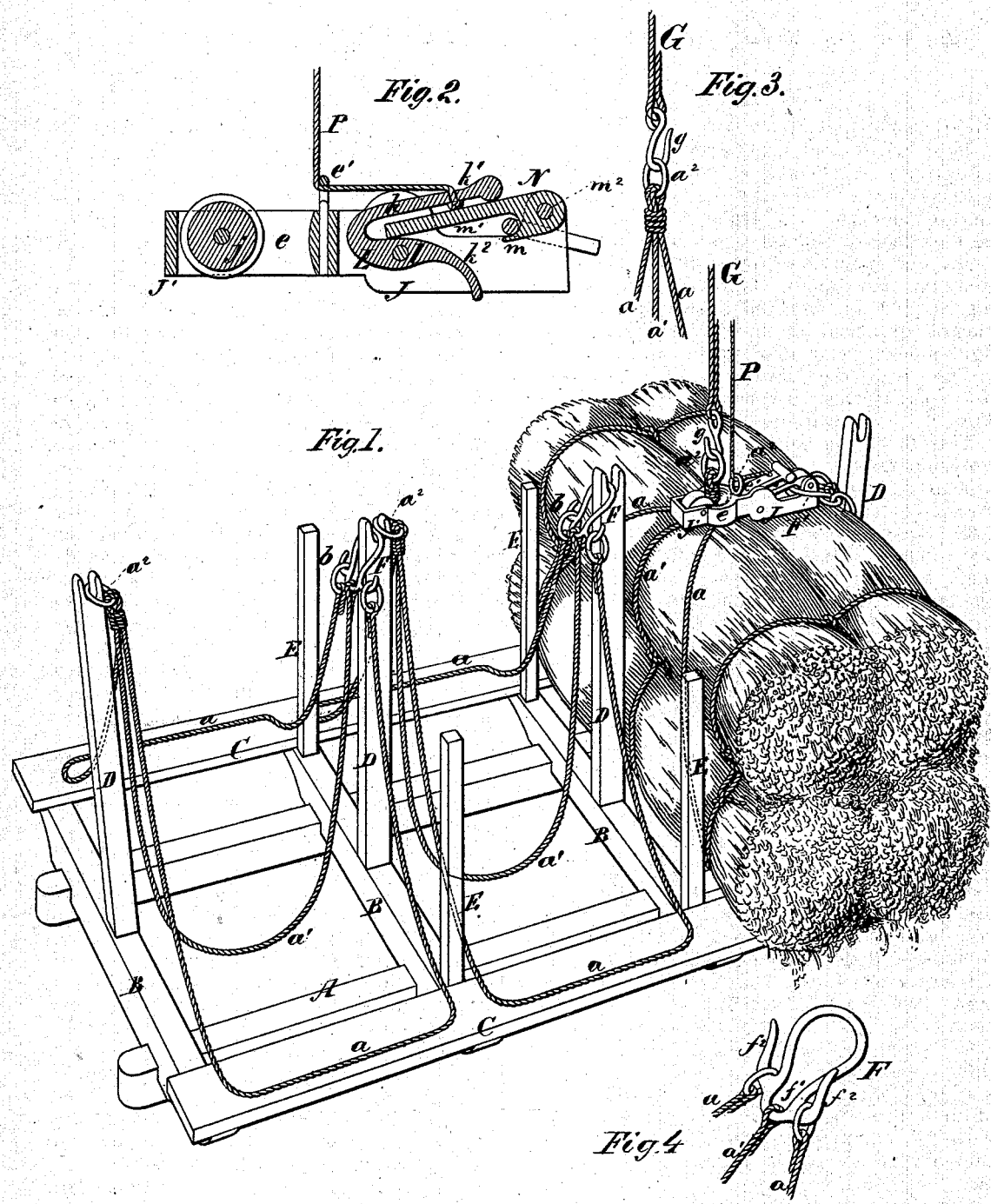

MARTIN A. DILLEY, OF LE ROY, KANSAS.

IMPROVEMENT IN HAY-UNLOADERS.

Specification forming part of Letters Patent No. 146,436, dated January 13, 1874; application filed November 22, 1873.

*To all whom it may concern:*

Be it known that I, MARTIN A. DILLEY, of Le Roy, in the county of Coffey and State of Kansas, have invented a new and valuable Improvement in Hay-Unloaders; and I do hereby declare that the following is a full, clear, and exact description of the construction and operation of the same, reference being had to the annexed drawings making a part of this specification, and to the letters and figures of reference marked thereon.

Figure 1 of the drawing is a representation of a perspective view of my hay-unloader. Figs. 2, 3, and 4 are detail views of the same.

This invention relates to certain novel improvements, which are designed to facilitate the unloading of wagons of hay or grain, wherein I employ a divisional wagon-rack provided with centrally-arranged posts or stakes, which are notched at their upper ends for the attachment to them of eyes or loops, which are on the ends of the slings, thus holding the latter in proper position to receive the hay or grain, and to be afterward drawn tightly around the same by the elevating device. I also employ a horned link for each sling; also, a novel device for connecting the ends of the slings together around the loads, and allowing the latter to be discharged when elevated to the proper place for their deposit, as will be hereinafter explained.

The following is a description of my improvements:

The wagon-rack, on which the material is loaded, consists of longitudinal beams A A and longitudinal side boards C C, which are rigidly secured to transverse beams B B B B, in lines parallel to each other. The side boards C C are secured on top, and at the ends of the transverse beams, in a plane which is higher than the beams A A. D D represent centrally-arranged posts or stakes, having notches in their upper ends; and E E represent posts or stakes, which are arranged on opposite sides of the intermediate posts D, and which form, with the central posts, three divisions on the rack for receiving three separate masses of hay; or, if desired, a greater or less number of divisions may be made. By thus dividing up the load, it can be handled with greater facility and convenience. Each one of said divisions is provided with a sling, which is composed of three ropes, $a\,a^1\,a$, connected permanently to a ring, $a^2$, at one end, and connected to a horned link, F, at their other ends. The central and shortest rope, $a^1$, is permanently secured to the lower or contracted portion, $f^1$, of said link F, and the side ropes $a\,a$ are connected to horns $f^2\,f^2$, springing from the sides of the link, by means of rings $b\,b$. The ends of the ropes $a\,a$ are detachable from the link F, for the purpose of preventing hay or straw from lodging in the sling at such points; and such detachment will take place when a load is dropped from the slings. The slings are hung in their respective divisions of the wagon-rack by hooking the links F and rings $a^2$ upon the notched ends of the posts D, as shown in Fig. 1, and spreading out laterally side ropes $a\,a$, so as to afford a good wide bed for the load in each division of the rack.

For the purpose of binding the hay in the several divisions on the wagon, and elevating the loads to the place of discharge, and then discharging them, I employ the following contrivances: J represents a frame or stack, consisting of two parallel side plates, an eye, $e$, and an elongated loop, J', in which latter is a grooved pulley, $j$. N represents a forked retainer, which is pivoted at $m^2$, between the ends of the side plates of frame J, and constructed with a long prong or arm, $m^1$, and a short one, $m$, between which arms is a rounded crotch. L represents a tripping-dog, which is shaped somewhat like the capital letter U, and pivoted at $l$ between the side plates of frame J. This dog receives, between its limbs $k\,k^2$, the tongue $m^1$, and allows this tongue to drop until the crotch thereof is below the pivot $m^2$. The limb $k$ of the dog L has a weight, $k^1$, on one end, which rests upon the tongue $m^1$ when in the position shown in Fig. 2. The limb $k^2$ of the dog is curved, as shown, and is intended for tripping the tongue $m^1$ when thrown up by means of a pull-cord, P, which is passed through the eye $e'$.

To elevate a load from the wagon-rack, the ring $a^2$ on a sling is detached from a post, D, and passed through the eye $e$, and connected to an elevating-rope, G, by means of a hook, $g$. The horned link F of the sling is then passed over the tongue or arm $m^1$, and drawn into its crotch, and this tongue or arm is pressed down between the limbs of the releasing-dog L, the latter being pressed down to the position shown in Fig. 2 in full lines. The connection between the ends of the sling being thus completed, the load is raised to the place for its discharge. The cord P is then pulled, which throws up the tongue $m^1$, and releases the load.

The pulley $j'$ prevents the sling-ropes from fraying, and also allows the weight of the load to draw the sling tightly around it. The pivoted retainer N receives the strain below its pivot $m^2$, which prevents any casual detachment of the ends of the sling while raising a load.

What I claim as new, and desire to secure by Letters Patent, is—

1. The wagon-rack, subdivided by posts D E, the posts D being notched to receive the rings $a^2$ and links F of the slings, substantiallly as described.

2. The detaching device provided with a pulley, $j$, and eye $e$ for the ring ends of the slings, as shown and described.

3. The U-shaped tripping-dog L, combined with the forked retainer N, constructed and pivoted between the frame J, as and for the purposes described.

4. The horned link F, constructed and attached to one end of the slings, as and for the purposes described.

In testimony that I claim the above I have hereunto subscribed my name in the presence of two witnesses.

MARTIN A. DILLEY.

Witnesses:
R. M. HAZARD,
WESLEY S. MANN.